(12) United States Patent
Pettersen

(10) Patent No.: US 7,290,334 B2
(45) Date of Patent: Nov. 6, 2007

(54) METHOD AND DEVICE FOR CONNECTING AN ELECTRIC CONDUCTOR TO A METAL RAIL AND A TOOL FOR ATTACHING A BUSHING IN AN OPENING IN A METAL RAIL

(75) Inventor: Ola Pettersen, Stora Södergatan (SE)

(73) Assignee: Safetrack Infrasystems Sisab AB, Staffanstorp (SE)

( * ) Notice: Subject to any disclaimer, the term of this patent is extended or adjusted under 35 U.S.C. 154(b) by 8 days.

(21) Appl. No.: 11/273,977

(22) Filed: Nov. 15, 2005

(65) Prior Publication Data

US 2006/0160434 A1 Jul. 20, 2006

(30) Foreign Application Priority Data

Nov. 26, 2004 (SE) .................................... 0402875

(51) Int. Cl.
*H01R 43/04* (2006.01)

(52) U.S. Cl. ........................ 29/876; 20/825; 20/881; 20/882; 439/801

(58) Field of Classification Search .................. 29/876, 29/825, 881, 882, 842, 857; 439/801
See application file for complete search history.

(56) References Cited

U.S. PATENT DOCUMENTS

| | | | | |
|---|---|---|---|---|
| 2,305,150 | A * | 12/1942 | Fearon | 174/167 |
| 3,577,114 | A * | 5/1971 | Hawkins | 439/277 |
| 4,978,264 | A | 12/1990 | Philippe | |
| 5,288,244 | A * | 2/1994 | Lien | 439/362 |
| 6,244,517 | B1 * | 6/2001 | Courtois et al. | 238/14.05 |
| 6,257,939 | B1 * | 7/2001 | Courtois et al. | 439/801 |

FOREIGN PATENT DOCUMENTS

| | | |
|---|---|---|
| EP | 0328946 | 2/1989 |
| EP | 0891007 | 4/1998 |
| EP | 0 945 919 | 9/1999 |

* cited by examiner

Primary Examiner—Gary F. Paumen
(74) Attorney, Agent, or Firm—Fredrikson & Byron, P.A.

(57) ABSTRACT

Method for connecting an electrical conductor (17) to a metal bar (11) by bolted connection, whereby a bushing (10) provided with a collar (12) is inserted into, and is by radial expansion fastened in, a hole in the metal bar, a cable lug (16) connected to the electrical conductor is caused to abut against the bushing, and the cable lug is connected to the bushing by means of a bolt (14) disposed in the bushing and forming part of the bolted connection. An expansion device (23) with a threaded portion (26) and an expansion collar (25) is drawn through the bushing in order to expand the latter. A fitting nut (20) with a thread (21) cooperating with the threaded portion (26) is rotated in abutment against the collar (12) of the bushing in order to draw the expansion tool through the bushing. The expansion device (23) with the fitting nut (20) is removed from the bushing, a bolt is inserted through the bushing and a tapered clamp ring (13) surrounding the bolt and abutting against a head (15) of the bolt is pressed into the bushing during radial widening of the bushing and radial constriction of the clamp ring round the bolt as a result of tightening of the bolted connection.

Bolted connection, comprising the bushing (10) and a bolt (14) provided with a head (15) and inserted through the bushing, whereby the length of the bushing exceeds the length of a hole formed for the bolted connection in a metal bar. A tapered clamp ring (13) is disposed about the bolt at the head of the bolt. The tapered clamp ring is pressed into the bushing between the bushing and the bolt, and the collar of the bushing has an unengaged flat annular surface.

A tool for fastening the bushing comprises an elongate expansion device (23) and a fitting nut (20) cooperating with the expansion device (23). The expansion device (23) is provided with a threaded portion (26) at a first end and a tool spigot (24) at a second end and is provided between said portions with an expansion collar (24) with circumference increasing from the threaded portion (26).

7 Claims, 3 Drawing Sheets

METHOD AND DEVICE FOR CONNECTING AN ELECTRIC CONDUCTOR TO A METAL RAIL AND A TOOL FOR ATTACHING A BUSHING IN AN OPENING IN A METAL RAIL

CROSS REFERENCE TO RELATED APPLICATION

The present application claims priority to Swedish Patent Application No. 0402875-9 filed Nov. 26, 2004, the teachings of which are incorporated herein by reference.

FIELD OF THE INVENTION

A method and a device for connecting an electrical conductor to a metal bar, e.g. a railway track rail, by bolted connection. The invention also relates to a tool for fastening a bushing in a hole in the metal bar. The bushing forms part of the bolted connection.

Within the railway field there is a need to connect electric cables to railway track rails. The resulting electrically conducting connection may form part of, for example, a signalling system for indicating the presence of traffic, earthing of rails or feeding back of high operating currents.

STATE OF THE ART

Existing methods for effecting desired connections include the welding of steel cables or steel cable lugs and the soldering of cables or cable lugs. There are also various forms of keyed connection, bolted connection and combinations of these.

Connections are assembled outdoors in unprotected environments under time pressure. It is not unusual that constituent parts are subject to damage, oxidation or contamination during transport or assembly. Connections are also subject to severe vibration due to passing trains and to mechanical effects caused by, for example, brushing, snow clearance or other track maintenance work. There may additionally be environmental influences which have adverse effects on electrical and mechanical characteristics, e.g. water penetrating via moisture gaps and possibly leading to corrosion or destructive ice expansion, the effects of cyclic temperature patterns (day/night, summer/winter), pollution of air, ground and water, etc.

The bolted connections most commonly used comprise a bushing which is pressed firmly into a hole in the rail, and a bolted connection which connects a cable to the bushing via a cable lug. Assembly is usually effected by means of a hand-operated hydraulic tool.

A bolted connection of this type is referred to and described in EP0945919. Here the bushing is provided with a collar at one end, and the opposite end, which is pushed through a hole in the rail, is accommodated at the other side of the rail by a cover ring. An expansion tool is drawn through the bushing from the collared end. The material of the bushing flows out powerfully and fills a space in the cover ring. The space extends radially outside the hole in the rail, thereby anchoring the bushing in the hole. A disadvantage of the bolted connection according to EP0945919 is that the collar and the cover ring are deformed by the operation of drawing the expansion tool through. The result is that a cable lug or the like will not have good abutment against the collar. The bolted connection is intended for the fitting of a cable lug on each side of the rail.

A similar bolted connection is described in EP0328946. However, this bolted connection is intended for the fitting of a cable lug on only one side. The bushing used in EP0328946 has a cylindrical portion somewhat longer than the length of the hole formed in the rail, and a terminating collar at one end. An expansion tool drawn through the bushing from the collared end causes material of the bushing to flow so that radial widening is caused at the opposite end of the bushing. The bolted connection is locked by a cup washer or the like. This connection likewise involves deformation of the collar. With a view to avoiding problems caused by the deformation, the collar of the bushing is provided from the outset with a thicker central portion and a hole which is countersunk at the aperture.

EP0891007 refers to and describes a bolted connection for fitting cable lugs on both sides. Two bushings with collars are disposed coaxially inside one another in a hole in the rail. An expansion tool is drawn through the bushings, presses them together and presses them radially outwards in the hole. A disadvantage of this version is that one of the cable lugs is provided with a further contact surface in the electrical conductor path against the rail.

The object of a bolted connection with a bushing is to create between a cable lug and a rail a mechanically durable connection with a low electrical transition resistance which does not increase over time. The electrical transition resistance occurs where two electrical conductors meet. The transition resistance of the bolted connection usually occurs at two transitions, one of them between the cable lug and the bushing, the other between the bushing and the rail.

Factors affecting the transition resistance comprise not only materials and surface evenness but also such aspects as surface cleanliness, size of contact surface and contact pressure. It is also important that the connection be capable of maintaining sufficient contact pressure between the constituent electrically conducting parts for a service life of perhaps 20 years.

The bolted connections hitherto used in this context generally exhibit a number of deficiencies. Inter alia, the locking of the bolted connection is imperfect and there is risk of loosening as a result of the vibrations to which the connection is subject. Differences in material characteristics of rails, bushings and bolts also cause problems in that the electrical connection is impaired after temperature changes. There is also risk of the bushing used in bolted connections of this kind losing engagement with the rail, thereby jeopardising the electrical function.

SUMMARY OF THE INVENTION

One object of the present invention is to eliminate the deficiencies and problems indicated above. This object is achieved by a bushing being, as a first step, expanded radially to very good abutment against the shell surface of a hole formed in a metal bar, and by the bushing thereafter being face-ground at a collared first end and being widened radially at a second end. The grinding of the collar will result in very good electrical contact with the abutting cable lug or similar device on a cable.

When a bolt pushed through the bushing is tightened, its axial movement will cause the bolt to engage in a clamp ring inserted in the bushing and achieve good electrical connection with the metal bar via the bushing. The bolt is tightened by a nut which abuts against the collar of the bushing via a washer and a cable lug which is disposed between the washer and the collar of the bushing. The bolt is tightened at relatively high torque and to a high prestress so that the washer rotates and grinds away contamination and unevennesses on the cable lug. The cable lug is deformed and thereby comes to abut tightly against the whole surface of the washer.

One embodiment of the connection device according to the invention is intended for fitting a cable lug on one side, and another embodiment of the device is intended for fitting two cable lugs, i.e. one cable lug on each side of the metal bar. Either case involves a bolt which in a bolted connection holds together the connection device.

In one embodiment, the bolt is made of a material which allows such a high assembly force as to result in plastic deformation of the cable lug or lugs against a washer and a flange. The cable lug thus abuts fully against the washer and the flange, with no spring-back. Cases where cable lugs are fitted on both sides involve using a flanged clamp ring, which then replaces the clamp ring described above which is used in cases where a cable lug is fitted on only one side.

THE INVENTION

Figure 1:
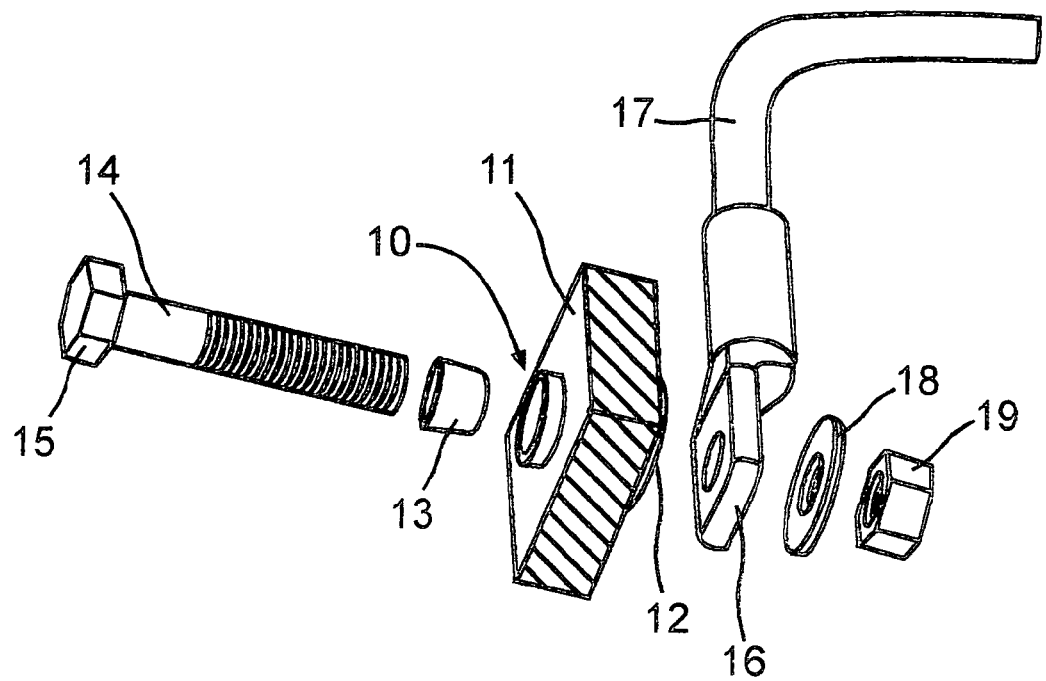
FIG. 1 depicts schematically an embodiment of a connection device according to the invention, together with a cable lug and a cable.

The embodiment of the invention depicted in FIG. 1 is intended for cases where a cable lug is fitted on only one side. A bushing 10 is fitted in a hole in a metal bar 11 in a manner described below. With advantage, the edges of the hole are somewhat chamfered. The metal bar may take the form of a rail, in which case the hole is formed in the web of the rail. The bushing 10 takes the form of a cylindrical hollow body with a collar or flange 12 at a first end (see also FIG. 8) and a straight termination at a second end. In this situation, the bushing 10 already abuts tightly against the wall of the hole or the shell surface of the metal bar and has good electrical connection with the latter.

A tapered clamp ring 13 has a first end provided with an outside diameter substantially corresponding to the inside diameter of the bushing 10 at the end with the straight termination when the bushing is fitted in position. The opposite second end of the clamp ring 13 has a larger outside diameter and cannot be pressed into the bushing 10 without considerable force. The length of the clamp ring 13 is less than the length of the bushing. With advantage, the length of the clamp ring is less than half or approximately one-third of the length of the bushing. A bolt 14 with a head 15 at one end and a threaded second end has its threaded end inserted through the clamp ring 13 and the bushing 10.

A cable lug 16 which has running through it an aperture whose diameter allows the bolt to pass through abuts against the flange 12. The cable lug 16 may take a variety of forms but will have a first flat surface for abutment against the flange 12. The cable lug 16 has running from it an electrical conductor or cable 17 which is intended to form part of an electric circuit in a manner not depicted in more detail.

The cable lug 16 is also provided with a second flat surface on the opposite side from the first flat surface. The second flat surface has abutting against it a washer 18 which accommodates, in a hole running through it, the bolt 14. Finally, a nut 19 is screwed in a conventional manner on the threaded end of the bolt 14. Tightening the nut 19 causes the head 15 of the bolt to press the tapered clamp ring 13 into the bushing 10. The clamp ring will then partly fill the space between the bushing and the bolt and will also exert a permanently high outward pressure between the bushing and the shell surface of the hole, and between the bolt and the clamp ring. The clamp ring will be deformed both against the bolt and against the bushing, thereby creating good electrical connection between them.

The sections of the bushing and the clamp ring situated outside the hole constitute a bulge which further secures the bushing in the axial direction. Tightening the nut also causes the washer to rotate, with the result that the contact surfaces between the washer and the cable lug are ground clean and assume a common profile. The washer may also be firmly connected to, or form an integral part of, the nut.

Like the bushing, the tapered clamp ring 13 is made of copper or other material with similar strength and good electrical conductivity. When the bolt 14 is tightened, its head 15 will be pressed into the clamp ring 13 and the bushing 10 so that the bolt 14 is locked against rotation (see also FIG. 6).

Figure 2:
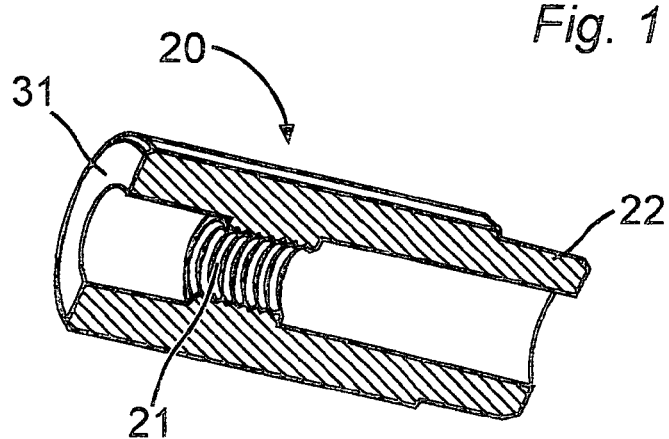
FIG. 2 depicts schematically a fitting nut which is used when assembling a connection device according to FIG. 1.
Figure 3:
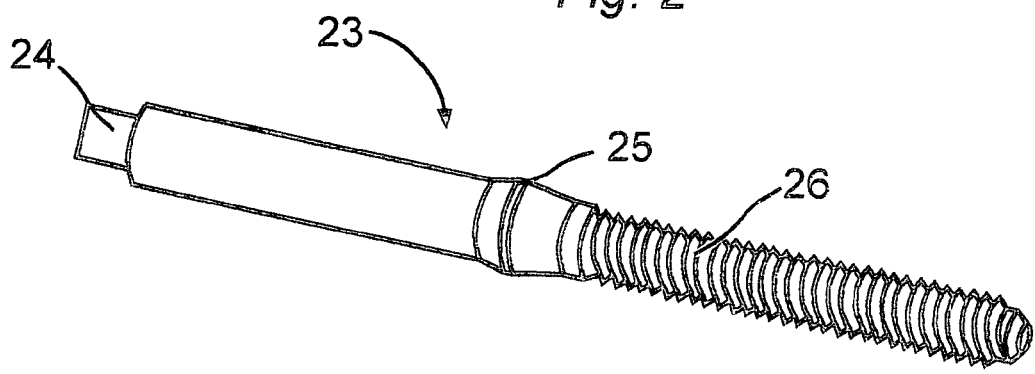
FIG. 3 depicts schematically an expansion tool which is used when assembling a connection device according to FIG. 1.

The bushing 10 is provided with an outside diameter corresponding to the inside diameter of the hole in the metal bar and can be pressed through the hole without any special tool. The means used for pressing the bushing 10 outwards radially and ensuring good electrical and mechanical contact with the metal bar 11 is an assembly tool depicted in FIG. 2 and FIG. 3.

The assembly tool comprises a fitting nut 20 with a countersunk threaded portion 21. The threaded portion is situated at an internal waist of the fitting nut. On either side of the waist there are clearance holes larger in diameter than the waist. A first end surface 31 of the fitting nut 20 is flat and intended to abut against the flange 12 of the bushing during the assembly operation. The opposite end of the fitting nut 20 is provided with a head 22 which in the embodiment depicted is hexagonal for cooperation with a conventional tool.

The assembly tool also comprises an elongate expansion device 23. The expansion device 23 is provided with a threaded portion 26 at a first end and a wrench spigot 24 at a second end. Between the ends, the expansion device 23 is provided with an expansion collar 25 which is linked to the threaded portion 26 by a conical transition. An elongate shank runs between the expansion collar 25 and the wrench spigot 24. The outside diameter of the threaded portion 26 is smaller than the inside diameter of the clearance holes formed in the fitting nut 20. This means that the expansion device 23 can move freely through the fitting nut when the latter is rotated during the process of expanding the bushing (see also FIG. 4 and FIG. 5).

Figure 4:
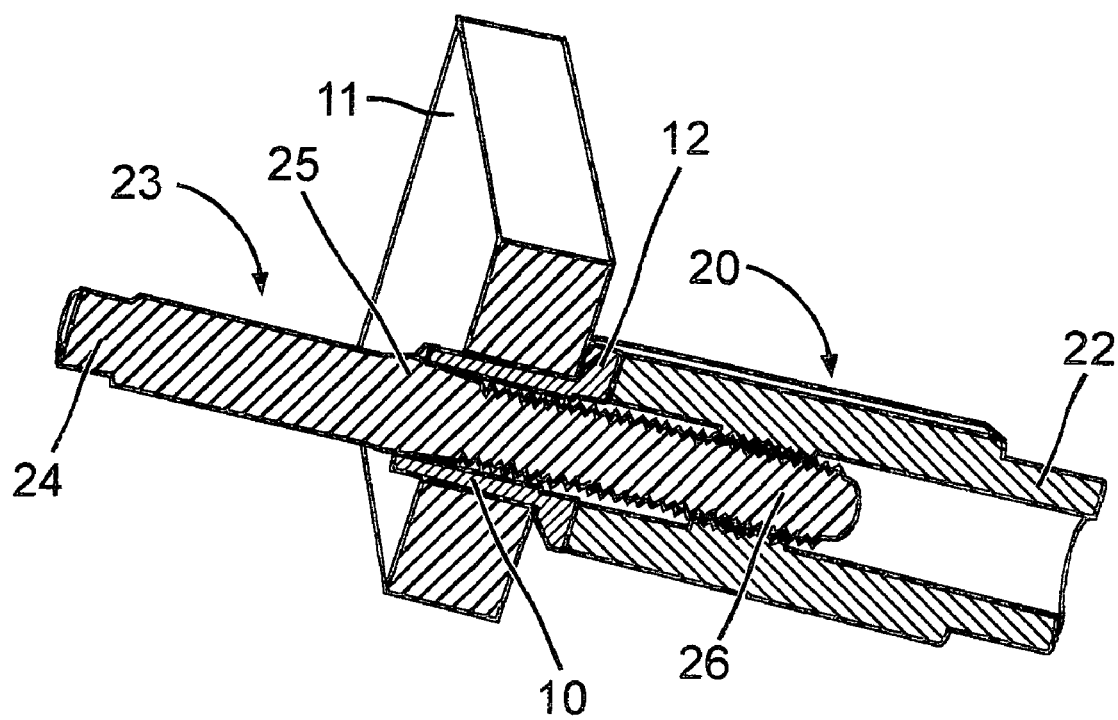
FIG. 4 depicts schematically a first stage of assembling the connection device according to the invention.

Assembling the bolted connection may be effected in the following manner with reference to FIG. 4 and FIG. 5. A hole of suitable diameter is formed in a metal bar 11, e.g. a rail web. The edges of the hole are chamfered to prevent local stress concentrations. A so-called gauge comprising a rod made in two portions with circular cross-sections of different sizes is used for checking the hole diameter. A first portion has a diameter corresponding to the smallest permissible diameter for the hole formed in the metal bar, and a second portion has a diameter corresponding to the largest permissible hole diameter. The bushing 10 is drawn over the expansion device 23 so that its end with the straight termination abuts against the expansion collar 25, and the threaded portion 26 of the expansion device 23 is screwed together with the fitting nut 20. In this situation, the flange 12 of the bushing 10 abuts against the flat end surface of the fitting nut 20.

The fitting nut 20 screwed together with the expansion device 23 is inserted through the hole in the metal bar 11 so that the end of the bushing with the straight termination protrudes somewhat from one side of the metal bar and the flange of the bushing abuts against an opposite side of the metal bar. Using the bolted connection according to the invention on railway track rails entails the fitting nut and the expansion device with the bushing being pushed through the rail from the outside, which means that the wrench spigot 24 of the expansion device 23 will be between the bars of the rail. This means that the safest possible way of working on the bolted connection will be that the person fitting the bolted connection can be outside the rail during the whole course of the operation.

Initially holding a tool about the wrench spigot and turning the fitting nut 20 by means of a tool applied to the head 22 causes the expansion device 23 to be drawn through the bushing 10. When the expansion collar 25 passes through the bushing 10, the result is radial widening and plastic deformation of the bushing and very good abutment against the shell surface of the hole. When the expansion collar has passed through, the section of the bushing which protrudes outside the metal bar will have been widened radially and shortened axially so as to form a bulge or small flange 27 which reliably prevents the bushing from sliding out of the hole. The small flange 27 also has an advantageous function in connection with screwing up the bolt 14, since the bolthead 15 will sink somewhat in it and thereby be prevented from rotating.

During the rotation of the fitting nut 20, the flange 12 of the bushing 10 will be polished to a completely clean and flat surface so that a cable lug fitted to the flange will have very good abutment against, and hence very good electrical connection with, the flange 12. A similar effect is achieved when the bolt 14 is screwed up and the washer 18 rotates against the upper side of the cable lug.

Figure 5:
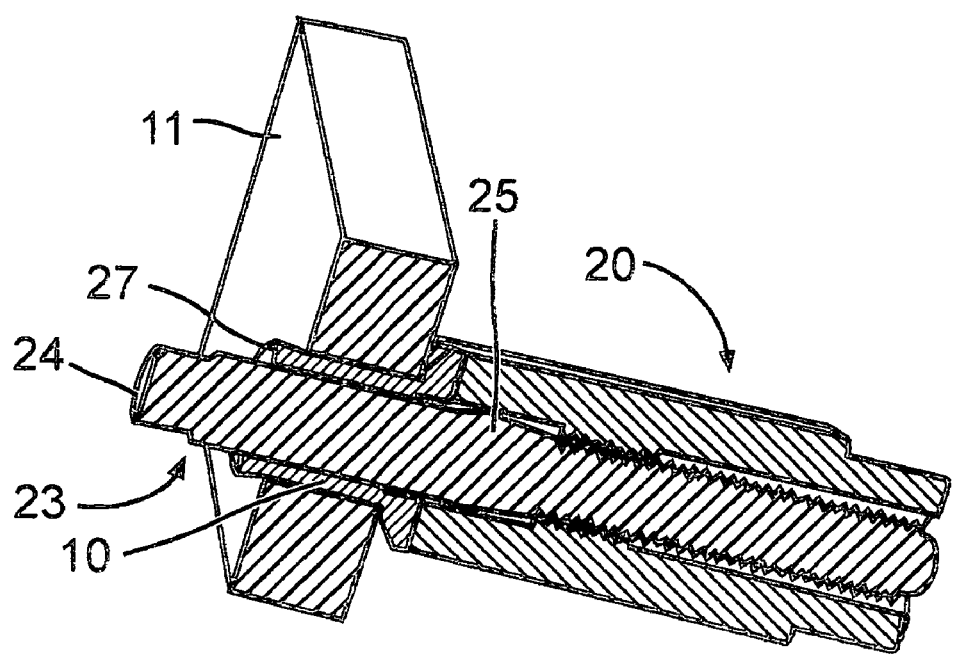
FIG. 5 depicts schematically a second stage of assembling the connection device according to the invention.

In the situation depicted in FIG. 5, the expansion device 23 has been drawn so far that the expansion collar 25 has passed through the hole of the bushing 10 and is in a clearance hole of the fitting nut. In this situation the fitting nut with the expansion device screwed in it is easy to remove from the bushing 10. The plastic deformation of the bushing results in a radial force acting between the bushing and the shell surface of the hole. In addition, the bushing 10 is fixed securely in position in the metal bar by the flange 12 and a small flange formed on the opposite side.

Thereafter the tapered clamp ring 13 is fitted to the bolt 14 so that the wider portion of the clamp ring 13 abuts against the bolthead 15, and the bolt 14 is inserted through the bushing 10. The narrower portion of the clamp ring 13 has an outside diameter which corresponds to, or is slightly smaller than, the inside diameter of the bushing after the expansion device 23 has passed through. The thicker portion of the clamp ring has an outside diameter which is larger than the inside diameter of the bushing after the expansion device has passed through. This means that a certain force has to be exerted in order to press the clamp ring into the bushing.

Figure 6:
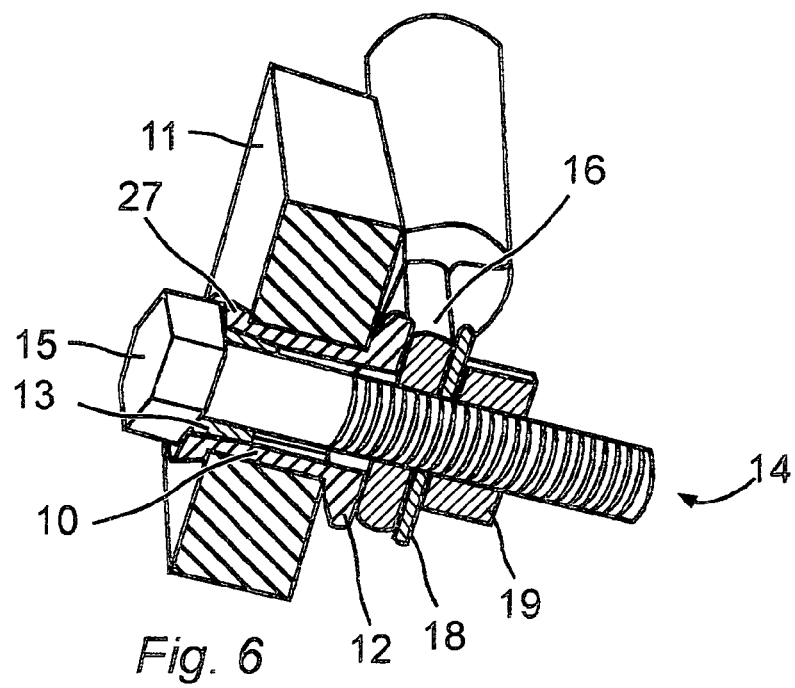
FIG. 6 depicts schematically the connection device in FIG. 1 with the bolt and the cable lug fitted in position.

The length of the bolt 14 is such that it protrudes at the opposite side of the metal bar sufficiently to enable a cable lug 16, a washer 18 and a nut 19 to be fitted to it, as depicted in FIG. 6. In the embodiment depicted (see also FIG. 1), the cable lug 16 is provided in a conventional manner with two mutually opposite flat sides. A first flat side abuts against the polished portion of the flange 12 of the bushing 10, and a second flat side has a washer 18 placed against it in a conventional manner. Thereafter a nut 19 is screwed on the bolt 14 in a conventional manner.

When the bolt 14 and the nut 19 are tightened, the washer 18 will rotate and thereby grind and polish the cable lug. The bolthead 15 will be drawn into and become countersunk in the small flange 27 formed on the bushing by the expansion operation, thereby preventing rotation of the bolt. The bolt may be made of high-strength material, thereby making it possible for very great prestress force to be applied and ensuring very good electrical and mechanical connection. The great prestress force also makes desired plastic deformation of the cable lug possible.

The shapes of, and the collaboration between, the bolt and the clamp ring increase considerably the total transition surface of the connection which is available for electric current as compared with previously known bolted connections. The bushing and the clamp ring also ensure that no narrow gaps occur between the connection and the metal bar. The risk of capillary moisture and other remaining moisture which might cause problems is thus also prevented.

Figure 7:
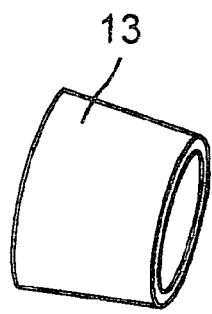
FIG. 7 depicts schematically a clamp ring forming part of the connection device described in FIG. 1.

FIG. 7 depicts a suitable embodiment of the clamp ring 13. The clamp ring is conical in the longitudinal direction and circular in cross-section. It is made of copper or similar material with good electrical conductivity and softness enabling it to flow out in the manner described above.

Figure 8:
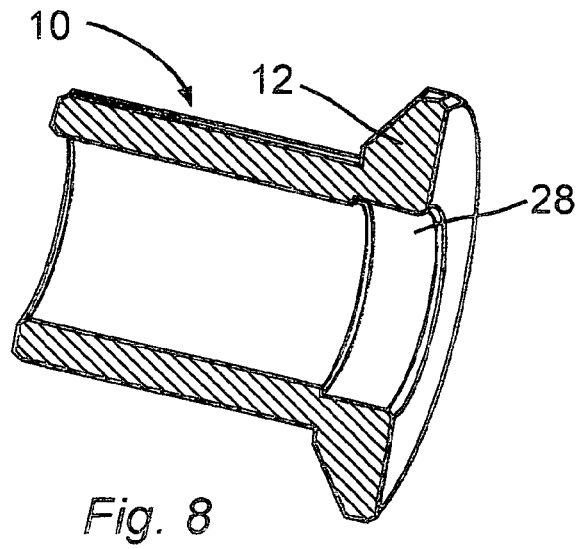
FIG. 8 depicts schematically a bushing forming part of the connection device described in FIG. 1.

An example of an embodiment of the bushing 10 is depicted in FIG. 8. The bushing 10 is cylindrical and is provided at one end with a flange 12. The bushing has running through it a hole which at the flanged end is provided with a recess 28 with a larger diameter. The portion 28 with larger diameter corresponds in length to the length of the flange, with the result that the expansion collar 25 of the expansion device 23 does not cause any radial expansion of the bushing outside the region which is enclosed by the metal bar. The shape of the portion 28 also ensures a completely flat outer flange surface even after the expansion device 23 has passed through. Any outflow of material caused by the expansion device can be accommodated in that portion. Another advantage achieved is that the work involved in using the expansion device is not increased unnecessarily, since only the section of the bushing which is within the metal bar is subjected to the radial widening. The bushing 10 is also made of copper or similar material with good electrical conductivity and softness enabling it to flow out in the manner described above.

Figure 9:
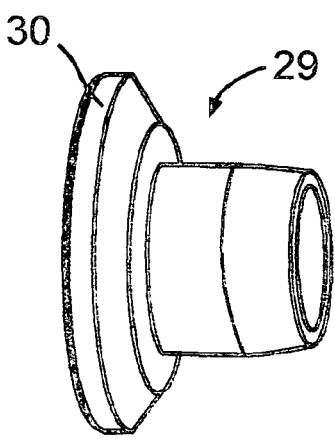
FIG. 9 depicts schematically a flanged clamp ring for use in cases where cable lugs are fitted on both sides.

According to the invention, the threaded connection may also be designed for fitting cable lugs on both sides. Such an embodiment involves using a modified clamp ring 29 depicted in FIG. 9. Like the clamp ring 13, the clamp ring 29 has a conical portion, but the conical portion leads to a straight cylindrical portion terminated by a clamp ring flange 30.

All the contact surfaces (i.e. all the abutting surfaces between the metal bar, the bolt and the cable lug 16 respectively) of the bushing 10, the clamp ring 13 and the flanged clamp ring are silver-plated, thereby ensuring very good electrical conductivity.

The bolt plays an active part in the electrical contact between the cable lug and the metal bar, since it has good electrical connection not only with the upper side of the cable lug via the nut and the washer but also with the metal bar via the clamp ring and the bushing. As the bolt plays an active part in the electrical contact, both sides of the cable lug can be used for electrical conduction, thereby reducing the total transition resistance. The two sides of the cable lug are mutually opposite, which means that, with the same prestress force, a larger surface can be used as transition surface for electric current without the outward pressure decreasing. This effect may be further enhanced by using a bolt made of high-strength material.

The invention claimed is:

1. A method for connecting an electrical conductor (17) to a metal bar (11) by bolted connection, whereby a bushing (10) provided with a collar (12) is inserted into, and is by radial expansion fastened in, a hole in the metal bar, a cable lug (16) connected to the electrical conductor is caused to abut against the bushing, and the cable lug is connected to the bushing by means of a bolt (14) disposed in the bushing and forming part of the bolted connection, characterised by drawing an expansion device (23) with a threaded portion (26) and an expansion collar (25) through the bushing in order to expand the latter, rotating a fitting nut (20) with a thread (21) cooperating with the threaded portion (26) in abutment against the collar (12) of the bushing in order to grind a surface of the collar of the bushing and draw the expansion tool through the bushing, removing the expansion device (23) with the fitting nut (20) from the bushing and inserting a bolt through the bushing and pressing a tapered clamp ring (13) surrounding the bolt and abutting against a head (15) of the bolt into the bushing during radial widening of the bushing and radial constriction of the clamp ring round the bolt as a result of tightening of the bolted connection.

2. A method according to claim 1, whereby the head of the bolt is countersunk in the clamp ring (13) and an end surface of the bushing as a result of tightening of the bolted connection, thereby preventing rotation of the bolt.

3. A method according to claim 1, whereby the clamp ring and the bushing are plastically deformed as a result of tightening of the bolted connection.

4. A method according to claim 1, whereby the cable lug is plastically deformed as a result of tightening of the bolted connection.

5. A method according to claim 1, whereby a washer (18) disposed between the cable lug and a nut (19) of the bolted connection is deformed as a result of tightening of the bolted connection.

6. A method according to claim 1, whereby as a result of tightening of the bolted connection the washer (18) grinds a side of the cable lug which abuts against the washer.

7. A method according to claim 1, whereby after tightening of the bolt there is electrical connection between the conductor (17) and the metal bar not only directly via the bushing (10) and the cable lug (16) but also via the clamp ring (13), the bolt (14), a nut (19) screwed on the bolt and a washer (18) disposed between the nut and the cable lug.

* * * * *